United States Patent
Fischer et al.

(10) Patent No.: US 11,503,834 B2
(45) Date of Patent: Nov. 22, 2022

(54) DEVICE FOR MEASURING THE SHOULDER JOINT POSITION OF CONTINUOUSLY CONVEYED POULTRY CARCASSES, ARRANGEMENTS FOR FILLETING POULTRY CARCASSES AND CORRESPONDING METHODS

(71) Applicant: Nordischer Maschinenbau Rud. Baader GmbH + Co. KG, Lübeck (DE)

(72) Inventors: Valentin Fischer, Lübeck (DE); Lasse Riggert, Lübeck (DE); Norbert Sass, Lübeck (DE)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 0 days.

(21) Appl. No.: 17/628,077

(22) PCT Filed: Jul. 8, 2020

(86) PCT No.: PCT/EP2020/069221
§ 371 (c)(1),
(2) Date: Jan. 18, 2022

(87) PCT Pub. No.: WO2021/013545
PCT Pub. Date: Jan. 28, 2021

(65) Prior Publication Data
US 2022/0256870 A1  Aug. 18, 2022

(30) Foreign Application Priority Data

Jul. 19, 2019 (DE) .......................... 102019119665.5

(51) Int. Cl.
*A22C 21/00* (2006.01)
*G01B 5/04* (2006.01)

(52) U.S. Cl.
CPC .......... *A22C 21/0053* (2013.01); *G01B 5/046* (2013.01)

(58) Field of Classification Search
CPC ..... A22C 25/16; A22C 21/0053; A22B 3/005; A22B 5/007
USPC ......................................... 452/179–181, 177
See application file for complete search history.

(56) References Cited

U.S. PATENT DOCUMENTS

| | | | |
|---|---|---|---|
| 6,935,942 B1 * | 8/2005 | Evers ................... | A22C 21/003 452/156 |
| 9,723,846 B2 * | 8/2017 | Gütte ....................... | A22B 5/00 |
| 10,455,842 B2 * | 10/2019 | Van Esbroeck ........ | A22B 7/003 |
| 2004/0255703 A1 | 12/2004 | Takai | |

(Continued)

FOREIGN PATENT DOCUMENTS

| | | |
|---|---|---|
| CN | 109068666 A | 12/2018 |
| DE | 19848498 A1 | 5/2000 |

(Continued)

OTHER PUBLICATIONS

International Search Report dated Oct. 20, 2020; International Application PCT/EP2020/069221.

*Primary Examiner* — Richard T Price, Jr.
(74) *Attorney, Agent, or Firm* — Dinsmore & Shohl LLP

(57) ABSTRACT

An apparatus for measuring the shoulder joint position of continuously conveyed poultry bodies has a measuring station, arranged along a conveying line, which is adapted to detect the shoulder joint position. Also provided is an arrangement for filleting poultry bodies having such an apparatus for measuring, and to corresponding methods.

20 Claims, 5 Drawing Sheets

(56) References Cited

U.S. PATENT DOCUMENTS

| | | | | |
|---|---|---|---|---|
| 2005/0032471 A1* | 2/2005 | Pfarr | ................... | B65G 43/08 |
| | | | | 452/181 |
| 2019/0116811 A1* | 4/2019 | Van Esbroeck | .... | A22C 21/0053 |

FOREIGN PATENT DOCUMENTS

| EP | 2599387 A1 | 6/2013 |
|---|---|---|
| JP | 2011177096 A | 9/2011 |
| JP | 6146809 B2 | 6/2017 |

* cited by examiner

DEVICE FOR MEASURING THE SHOULDER JOINT POSITION OF CONTINUOUSLY CONVEYED POULTRY CARCASSES, ARRANGEMENTS FOR FILLETING POULTRY CARCASSES AND CORRESPONDING METHODS

CROSS-REFERENCE TO RELATED APPLICATIONS

This application is the U.S. National Stage of PCT/EP2020/069221 filed Jul. 8, 2020, which claims priority to German Patent Application No. 10 2019 119 665.5, filed Jul. 19, 2019, the content of both of which are incorporated herein by reference in their entirety.

FIELD OF THE INVENTION

The present invention relates to an apparatus for measuring the shoulder joint position of continuously conveyed poultry bodies, comprising a conveying line having a conveying device having a plurality of receiving elements for holding the poultry bodies, which conveying device is adapted to continuously convey the poultry bodies in a conveying direction along a conveying path, wherein the conveying device is configured to convey the poultry bodies, at least in a measuring section of the conveying line, with the shoulder joints leading in the conveying direction, and a measuring station, arranged along the conveying line in the measuring section, having two measuring elements which are adapted, as one of the poultry bodies passes, to come into mechanical contact with the shoulder joints of the poultry body, and wherein the measuring elements are each arranged so as to be pivotable about a pivot axis such that, in a rest position, they extend projecting into the conveying path at least substantially transversely to the conveying direction and, on contact with the shoulder joints of the poultry body in a working position, are adapted to be pivotably movably deflectable in the conveying direction, wherein the measuring station has detection means for detecting the working positions of the measuring elements.

The invention relates further to an arrangement for filleting poultry bodies.

The invention relates further to a method for measuring the shoulder joint position of continuously conveyed poultry bodies, comprising continuously conveying the poultry bodies along a conveying path of a conveying line by means of a plurality of receiving elements of a conveying device which are adapted for holding the poultry bodies, wherein the poultry bodies, at least in a measuring section of the conveying line, are conveyed with the shoulder joints leading in the conveying direction, and scanning the shoulder joints of the poultry bodies by bringing the shoulder joints into mechanical contact with two measuring elements of a measuring station as one of the poultry bodies passes, which measuring elements are arranged along the conveying line in the measuring section, and wherein the measuring elements, on contact with the shoulder joints of the poultry body, are pivoted in the conveying direction out of a rest position, in which the measuring elements extend projecting into the conveying path at least substantially transversely to the conveying direction, into a working position, and in that the working positions of the measuring elements are detected by means of detection means of the measuring station.

The present invention relates further to a method for filleting poultry bodies.

BACKGROUND OF THE INVENTION

Such apparatuses, arrangements and methods are used in particular in the automated filleting of poultry bodies. Such an apparatus and a method is known, for example, from document DE 198 48 498 A1. By means of at least one measuring apparatus, the individual body dimensions of the poultry bodies are acquired and, on the basis of these measurements, at least one scraping apparatus is controlled by means of a control unit. A plurality of measuring elements is used for detecting the poultry body geometry. The measuring elements come into mechanical contact with the poultry body and are controlled in accordance with the poultry body geometry.

It is a disadvantage that the measuring elements, after deflection has taken place, must first move back into a rest position before the measuring operation can be carried out on a subsequent poultry body. This results in downtimes, during which no measuring operation is possible. These downtimes largely determine the maximum throughput rate of processable poultry bodies per unit time. The known measuring apparatuses and measuring methods thus no longer meet today's requirements for as high a throughput rate as possible.

SUMMARY OF THE INVENTION

Accordingly, the object of the present invention is to propose an apparatus which permits reliable measurement of the shoulder joint position on poultry bodies even at high throughput rates.

The object is achieved by an apparatus having the features mentioned hereinbefore in that the measuring elements comprise mechanical damping elements which are adapted to mechanically damp the measuring elements in the rest position.

The mechanical damping elements have the effect that the measuring elements, after they have been deflected by a poultry carcass, come to a standstill in the rest position as quickly as possible. The damping elements have the effect, on the one hand, that the measuring elements, on pivoting back into the rest position, perform no or only a very short-lasting natural oscillation. Any downtimes, during which a reliable measurement cannot be carried out, are thereby reduced to a minimum. This has a positive effect on the maximum throughput of poultry bodies per unit time, so that the total throughput can be increased significantly compared to the apparatuses known from the prior art.

An expedient configuration of the invention is characterised in that there are arranged on the measuring elements restoring means which are adapted to exert on the measuring elements a restoring moment in the direction towards the rest position.

The restoring means offer the advantage that the measuring elements are moved back into the rest position as quickly as possible after a measuring operation. In addition, the restoring means are configured to press the measuring elements against the surface of the poultry body so that they are permanently in contact with the poultry body during a measuring operation. In this manner it is ensured that the measuring elements follow the poultry body geometry exactly, and in this manner precise measurement of the shoulder joint position is possible.

A preferred further development of the invention is distinguished in that the detection means are in the form of switching elements by means of which the rest position and/or the working position are/is detectable.

The design of the detection means as switching elements offers multiple advantages. On the one hand, such switching elements are low-maintenance and extremely robust in the harsh environment in which the detection means are exposed to contaminants and moisture. On the other hand, detection means in the form of switching elements are inexpensive and can be evaluated on the control side with a comparatively low outlay.

According to a further preferred configuration of the invention, the switching elements are in the form of inductive proximity sensors.

The design of the switching elements as inductive proximity sensors offers the advantage that these are virtually wear-free and wholly insensitive to contamination and moisture acting from outside. Moreover, by means of the inductive proximity sensors, detection of the rest or working position of the measuring element in question takes place contactlessly.

A further expedient configuration of the invention is characterised in that the damping elements each comprise at least one pair of permanent magnets with mutually facing pole faces of opposite magnetic polarity.

The configuration of the damping elements as a pair of permanent magnets offers the advantage that comparatively high holding forces are effected by the magnets, which hold the measuring elements in the rest position. If the measuring element is deflected out of the rest position into the working position, the force of attraction of the pair of permanent magnets acts on the measuring element in only a negligible magnitude, since the holding forces between the magnets decrease considerably as the distance between the magnets increases. In other words, when the measuring element is deflected in proximity to the working position, the damping element scarcely affects the required deflection force at all. This is determined solely by the nature of the restoring means and the size of the restoring moment generated thereby. Only when the measuring element is in proximity to the rest position do the holding forces of the pair of permanent magnets increase, so that the desired mechanical damping of the movement of the measuring element in question in the rest position is achieved.

A preferred further development of the invention is distinguished in that at least one permanent magnet of one of the pairs of permanent magnets is arranged in each case on the measuring element so as to be pivotably movable therewith, and at least one permanent magnet of opposite polarity is arranged so as to be fixed.

The use of the mentioned permanent magnets offers the advantage that the damping elements are wear-and maintenance-free.

According to a further preferred configuration of the invention, the free ends of the measuring elements in the rest position are arranged so as to be oriented relative to a perpendicular to the conveying direction by a correction angle a contrary to the conveying direction.

By orienting the measuring elements by the mentioned correction angle a contrary to the conveying direction, the sensitivity of the measuring elements can be variably adjusted. The larger the correction angle, the greater the deflection distance that is required before the measuring elements leave the rest position and are pivoted into the working position. In other words, the correction angle a determines the size of a dead distance which the shoulder joints must cover in the conveying direction after coming into mechanical contact with the measuring elements for the first time before the measuring elements have left the rest position. It is thus possible in a particularly simple manner to adjust the robustness of the measuring operation relative to interference, which is caused, for example, by mechanical bouncing of the measuring elements, or to adjust the desired measurement sensitivity according to the particular requirement.

A further expedient configuration of the invention is characterised in that the apparatus further comprises a detection device arranged upstream of the measuring section with respect to the conveying direction, which detection device is configured to detect the passing of a reference point of the receiving elements, wherein the reference point of the receiving elements is so chosen that the shoulder joints of the poultry body lead in the conveying direction relative to the reference point, and a control device connected to the detection device and to the detection means, which control device is configured to determine an interval between the passing of the reference point and the detection of the working positions of the measuring elements and to determine the shoulder joint position on the basis of the size of this interval and the conveying speed of the conveying device.

It is thus possible in a particularly simple manner to determine the shoulder joint position exactly. This is particularly advantageous at a high throughput, since the evaluation of the mentioned interval size does not require a high outlay in terms of computing, so that, even at high throughputs, the shoulder joint position can be determined without difficulty in real time.

A preferred further development of the invention is distinguished in that the control device is configured to determine the interval on the basis of conveying distance or on the basis of time by means of a rotary encoder arranged on the conveying device for detecting the conveying position.

The determination of the conveying position by means of the rotary encoder and the determination of the interval on the basis of conveying distance offer the advantage that the conveying distance that is actually covered is known at all times and is used as the starting parameter. Accordingly, slight fluctuations in the conveying speed, for example, do not interfere with the determination of the shoulder joint position, since the entire evaluation takes place based not on time but on distance. In the case of a correspondingly constant conveying speed, it is alternatively possible to determine the interval based on time. In this case, the respective times of passing of the reference point and of the detection of the respective working position of the measuring elements are detected, and the interval represents the difference between the determined times.

The object is achieved by the arrangement mentioned hereinbefore for filleting poultry bodies, wherein the arrangement comprises the above-described apparatus according to the invention for measuring the shoulder joint position of the continuously conveyed poultry bodies and at least one filleting station arranged downstream in the conveying direction, wherein the processing tools of the filleting station are adapted to be controlled on the basis of the working positions of the measuring elements detected by means of the apparatus.

In this manner, precise control of the processing tools of the filleting station is achieved even at high throughput rates.

The object is further achieved by an arrangement having the features mentioned hereinbefore in that the processing tools are adapted to be controlled on the basis of the detected working position of the measuring elements that last comes into mechanical contact with the poultry body.

By evaluating the measuring element that last came into mechanical contact with the poultry body in its working position, the shoulder joint of one of the poultry bodies that has the smaller dimension is measured. If the geometries of the corresponding body halves of the poultry body are not identical but of different sizes, the smaller poultry body side is used as the starting point for the shoulder joint measurement. It is thereby ensured that the processing tools of the downstream filleting station are always guided to the poultry body for processing at the correct time, so that, even in the case of poultry bodies in which the geometry is not the same on both sides, optimal processing nevertheless takes place.

According to a further preferred configuration of the invention, the processing tools each comprise tools for processing the right and left side of the poultry body and are adapted to be controlled separately by the measuring elements.

Separate control of the tools for processing the right and left side offers the advantage that, even in the case of asymmetries of the two body halves, each side is processed individually and thus optimally.

The object is further achieved by a method having the features mentioned hereinbefore by mechanical damping of the pivoting movement of the measuring elements in the rest position by means of mechanical damping elements.

The advantages associated with the method according to the invention have substantially already been described in detail in connection with the apparatus according to the invention. In order to avoid repetition, we therefore refer in connection with the method according to the invention and the further embodiments thereof to the statements made hereinbefore with regard to the established advantages of the apparatus according to the invention.

A preferred further development of the invention is distinguished by exertion of a restoring moment in the direction towards the rest position by means of restoring means arranged on the measuring elements.

A further expedient embodiment of the invention is characterised by detection of the rest position and/or of the working position by means of the detection means in the form of switching elements.

According to a further preferred configuration of the invention, the method is characterised by contactless detection of the rest position and/or of the working position by the switching means in the form of inductive proximity sensors.

According to a further preferred configuration of the invention, damping takes place magnetically.

A preferred further development of the invention is distinguished in that the free ends of the measuring elements in the rest position are oriented relative to a perpendicular to the conveying direction by a correction angle α contrary to the conveying direction.

According to a further preferred configuration of the invention, the method is further characterised by detection of a time of passing of a reference point of the receiving elements by means of a detection device arranged upstream of the measuring section with respect to the conveying direction, wherein the reference point of the receiving elements is so chosen that the shoulder joints of the poultry body lead in the conveying direction relative to the reference point, and by determination of a time interval between the time of passing of the reference point and the time of detection of the working positions of the measuring elements by means of the detection means, and by determination of the shoulder joint position by means of a control device on the basis of the size of the time interval and the conveying speed of the conveying device.

The invention is also achieved by the method mentioned hereinbefore for filleting poultry bodies, wherein the method comprises determining the shoulder joint position of the continuously conveyed poultry bodies by means of an above-mentioned method and controlling processing tools of an at least one filleting station arranged downstream of the measuring station in the conveying direction on the basis of the working positions of the measuring elements detected by means of the detection means.

With regard to the advantages of this method according to the invention, we refer to the preferences mentioned in connection with the arrangement according to the invention, which apply analogously.

BRIEF DESCRIPTION OF THE DRAWINGS

Further preferred and/or expedient features and embodiments of the invention will become apparent from the description. Particularly preferred embodiments will be explained in greater detail with reference to the accompanying drawing.

In the drawing.

DETAILED DESCRIPTION OF THE INVENTION

Figure 1:
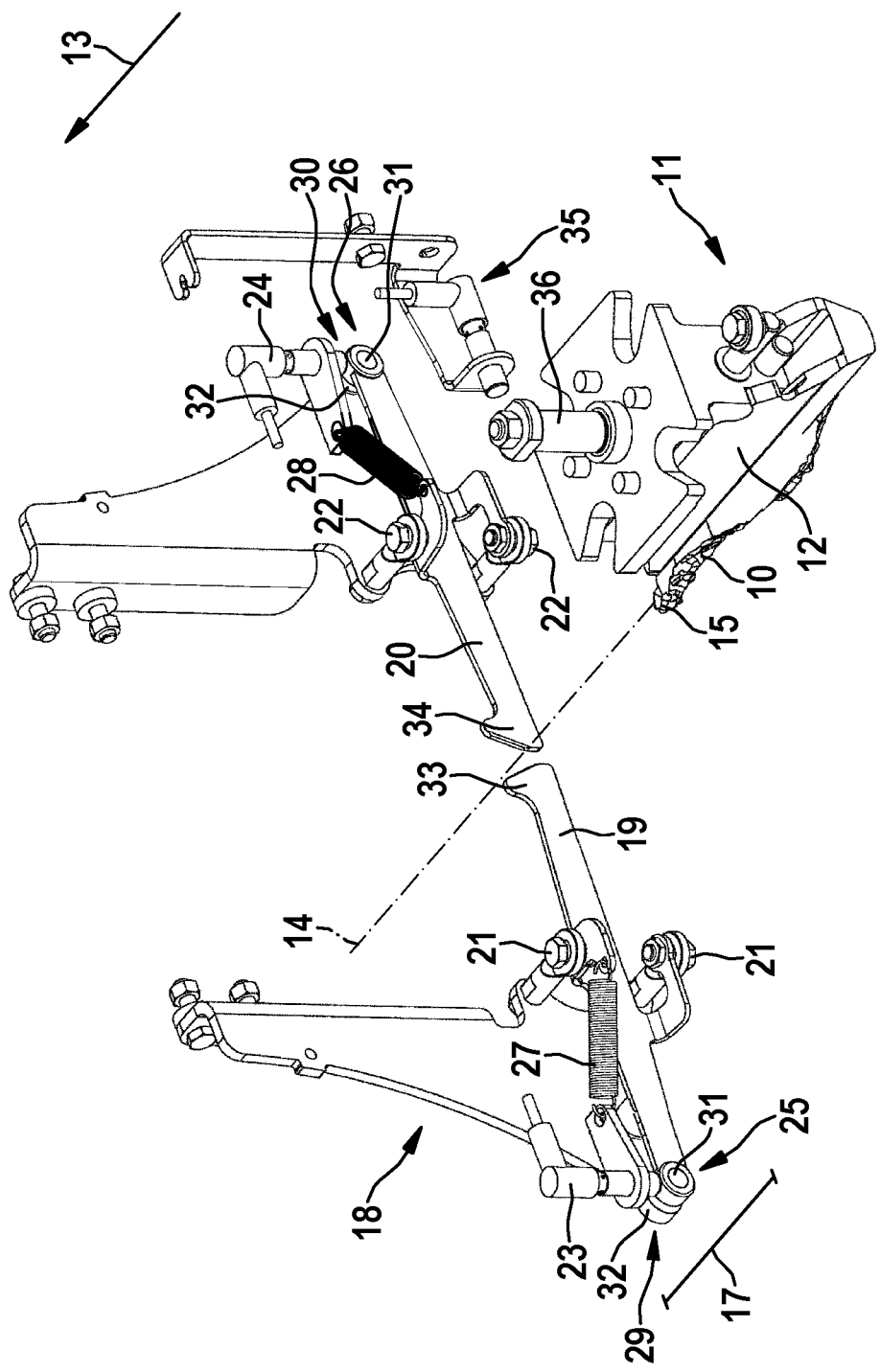
FIG. 1 is a perspective view of the apparatus according to the invention, in which the measuring elements are each in a rest position.

FIG. 1 is a perspective view of the apparatus according to the invention, which is adapted to measure the shoulder joint position of continuously conveyed poultry bodies 10. In the drawing, the poultry body 10 is shown only schematically, namely in the form of a breast cap, wherein, for reasons of clarity, the breast cap is shown without adhering flesh parts. The apparatus according to the invention comprises a conveying device, of which only selected parts are illustrated in the figures for reasons of clarity. The conveying device has a plurality of receiving elements 11 for holding the poultry bodies 10. As is shown in FIG. 1, the poultry body 10 is preferably arranged on a saddle element 12 of one of the receiving elements 11. The conveying device is further configured to convey the poultry bodies 10 in a conveying direction 13 along a conveying path 14—indicated in FIG. 1 by a broken line. The conveying device thus forms a conveying line—not denoted specifically in the drawing. The conveying device is, as is shown in the drawing, preferably in the form of an overhead conveying device. The conveying device is further configured to convey the poultry bodies 10 with the shoulder joints 15, 16 leading. In other words, the poultry body 10 is oriented on the receiving elements 11, or the saddle element 12, in such a manner that it is conveyed with its shoulder joint side leading.

Figure 2:
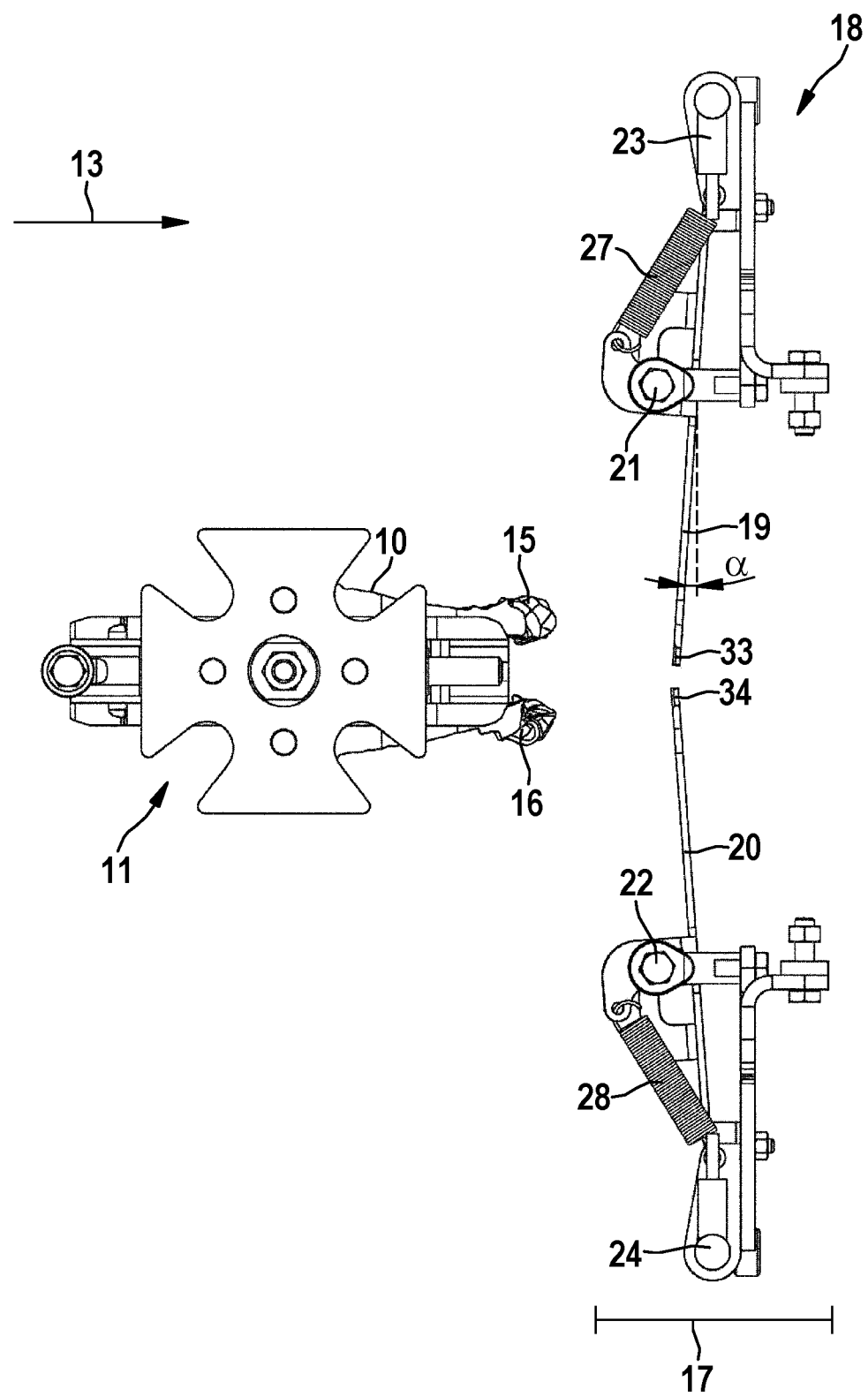
FIG. 2 is a plan view of the apparatus shown in FIG. 1.
Figure 3:
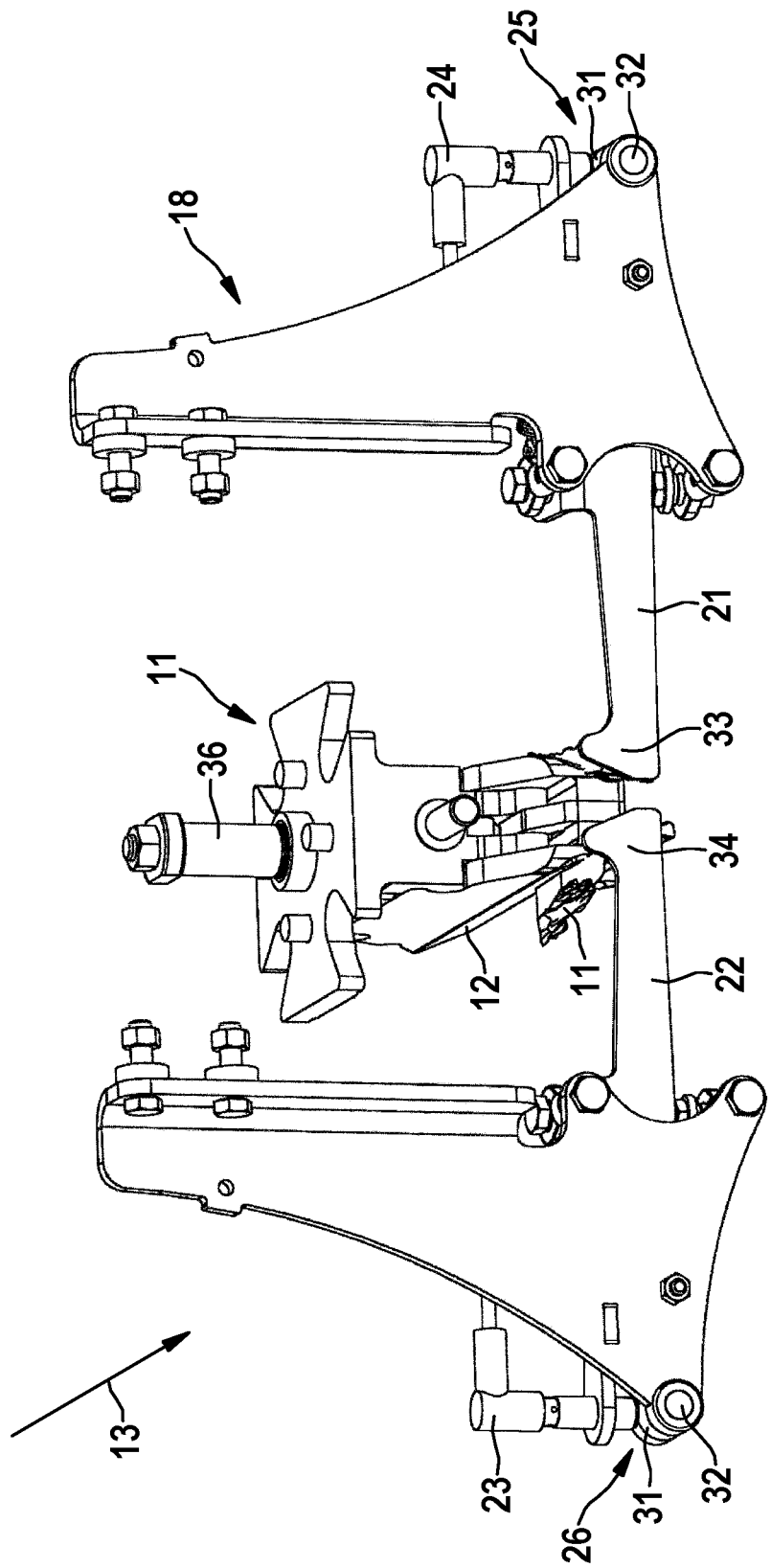
FIG. 3 is a perspective view of the apparatus shown in FIG. 1 and FIG. 2, looking in a direction contrary to the conveying direction.

As is shown in FIG. 1, a measuring station 18 is arranged along the conveying line in a measuring section 17 of the conveying line. The measuring station 18 has two measuring elements 19, 20, which are adapted, when one of the poultry bodies 10 passes, to come into mechanical contact with the shoulder joints 15, 16 of the poultry body 10. Such contacting of the shoulder joints 15, 16 with the measuring elements 19, 20 is shown, for example, in FIGS. 4 and 5. FIGS. 1, 2 and 3, on the other hand, show a state in which the receiving element 11 with the poultry body 10 is only in the intake to the measuring station 18.

FIG. 1 further shows that the measuring elements 19, 20 are each arranged so as to be pivotable about a pivot axis 21, 22. The perspective view according to FIG. 1 shows the measuring elements 19, 20 each in a rest position, in which they extend projecting into the conveying path 14 transversely to the conveying direction 13 or with only a slight deviation from the perpendicular to the conveying direction 13.

Figure 4:
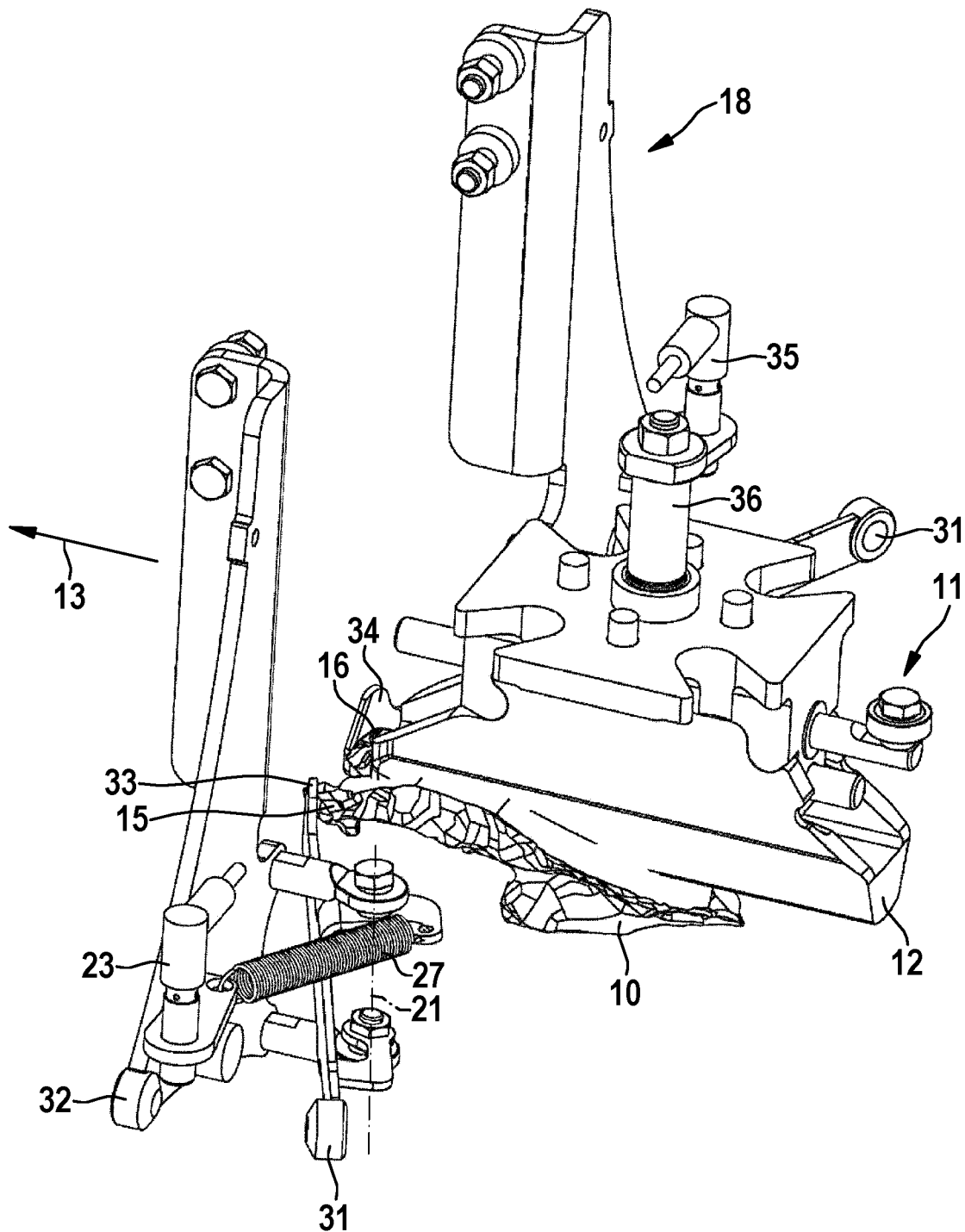
FIG. 4 is a perspective view of the apparatus according to the invention, in which the measuring elements are each in a working position.
Figure 5:
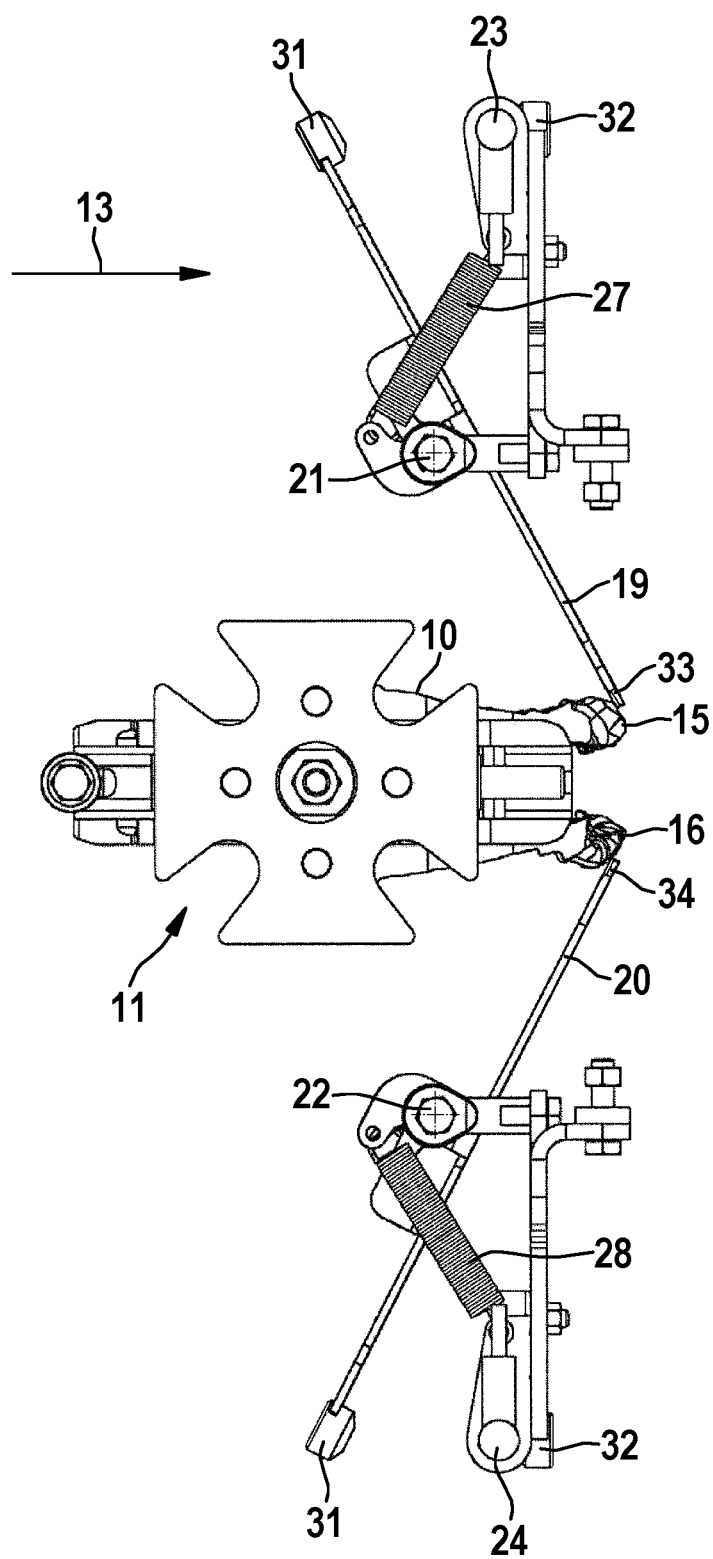
FIG. 5 is a plan view of the apparatus shown in FIG. 4.

As is shown in FIG. 4, the measuring elements 19, 20 are each arranged about the pivot axes 21, 22 such that, on contact with the shoulder joints 15, 16 of the poultry body 10, they are deflected in the conveying direction 13 out of the rest position into a working position. The deflection into the working position is in each case detected by means of detection means 23, 24. Instead of detecting the pivoting of the measuring elements 19, 20 into the working position, it is also possible that the detection means 23, 24 detect that the rest position has been left.

The measuring elements 19, 20 additionally comprise mechanical damping elements 25, 26, which are adapted to mechanically damp the measuring elements 19, 20 in the rest position. In other words, the function of the damping elements 25, 26 is to prevent decay processing of the measuring elements 19, 20 as they pivot from the working position back into the rest position, or to strongly damp such a decay process. As a result, the measuring elements 19, 20, after being deflected into the working position, come to rest as quickly as possible and in this manner are ready within a very short time for a new measurement of the shoulder joint position of the subsequent poultry body 10.

There are advantageously arranged on the measuring elements 19, 20 restoring means 27, 28, which are adapted to exert on the measuring elements 19, 20 a restoring moment in the direction towards the rest position. As is shown in the drawing, tension springs are preferably used as the restoring means 27, 28. These tension springs are arranged, as shown in the drawing, in such a manner that they exert a restoring moment on the measuring element 19, 20 in question as soon as it is deflected out of its rest position. Alternatively, it is possible to use compression springs, which are correspondingly pressurised when the measuring element 19, 20 in question is deflected out of the rest position and in this manner exert on the respective measuring element 19, 20 a corresponding restoring moment in the direction towards the rest position.

According to a further alternative embodiment, the restoring means 27, 28 can be formed as pneumatic cylinders or by a permanent magnet arrangement.

Preferably, the detection means 23, 24 are in the form of switching elements, for example in the form of an electromechanical switching contact. The switching elements can, however, also comprise optical scanning means, for example a light barrier arrangement. By means of the detection means 23, 24, either the rest position of the measuring elements 19, 20 and/or the working position thereof is detected. Particularly preferably, the switching elements—as is shown in the drawing—are in the form of inductive proximity sensors.

Advantageously, the measuring elements 19, 20—as is shown in the drawing—are in the form of two-armed levers, wherein one of the lever arms forms a type of measuring vane which is adapted to come into contact with the shoulder joints 15, 16 of the poultry bodies 10, while the respective other lever arm comprises the damping elements 25, 26 mentioned hereinbefore and also the detection means 23, 24. Alternatively, it is possible to configure the measuring elements 19, 20 also as a single-armed lever. In this case, all the above-mentioned components are arranged in each case on this one lever arm of one of the measuring elements 19, 20.

Advantageously, the damping elements 25, 26 each comprise at least one pair of permanent magnets 29, 30, that is to say in each case at least two magnets with mutually facing pole faces of opposite magnetic polarity. Preferably, at least one permanent magnet 31 of one of the pairs of permanent magnets 29, 30 is arranged on the measuring element 19 so as to be pivotably movable therewith. A further permanent magnet 32 is arranged so as to be fixed, so that the permanent magnets 31, 32 attract one another.

Preferably, the free ends 33, 34 of the measuring elements 19, 20, as is shown in FIG. 2, are arranged in the rest position so as to be oriented relative to a perpendicular to the conveying direction 13 by a correction angle a contrary to the conveying direction 13.

Further preferably, the correction angle a is adjustable. According to a further advantageous embodiment of the invention, the apparatus according to the invention comprises a detection device 35. The detection device is configured to detect the passing of a reference point of the receiving elements 11. The reference point of the receiving elements 11 is thereby so chosen that the shoulder joints 15, 16 of the poultry body 10 lead in the conveying direction 13 relative to this reference point. For example, the connecting element 36 shown in the drawing, with which in each case one of the receiving elements 11 is connected to a conveying chain—not shown in the drawing—of the conveying device, forms such a reference point.

The apparatus according to the invention further comprises a control device connected to the detection device 35 and to the detection means 23, 24. The control device is configured to determine an interval between the passing of the reference point and the detection of the working position of one of the measuring elements 19, 20 and to determine the shoulder joint position on the basis of the size of this interval and the conveying speed of the conveying device, or of the conveying chain. Preferably, the connecting element 36 forming the reference point is arranged centrally on the receiving element 11. Owing to the identical geometry of the receiving elements 11, it is thus possible in a simple manner, by means of the control device, to ascertain the geometry of the poultry body 10 and in particular the position of the shoulder joints 15, 16 on the basis of the mentioned interval size, taking account of the mentioned geometrical relationships.

Preferably, the control device is configured to determine the mentioned interval on the basis of conveying distance by means of a rotary encoder arranged on the conveying device for detecting the conveying position—and not shown in the drawing. For example, the rotary encoder is in the form of a rotary pulse encoder which, according to a predefined division, delivers a corresponding electric pulse for each position change of the receiving elements 11 in the conveying direction 13. On the basis of these pulses, the conveying speed can be determined exactly at any time. The pulses of the rotary pulse encoder thus form an internal clock, wherein the number of pulses provides information about the conveying distance that has been covered. If the interval is determined, as mentioned hereinbefore, on the basis of the conveying distance, then the control device is configured to determine the path distance covered between the passing of the reference point and the detection of the working position of the measuring element 19, 20 in question. The size of the interval, or the number of pulses detected, can then be evaluated as a measure of the shoulder joint position. Alternatively, it is possible to determine the interval on the basis of time, in which case the control device is configured, for example, to detect the time difference that elapses between the passing of the reference point and the detection of the working position of the measuring element 19, 20 in question and to ascertain the shoulder joint position on the basis of this time difference.

The present invention also includes an arrangement for filleting poultry bodies 10. Such an arrangement comprises the apparatus described hereinbefore for measuring the shoulder joint position, and at least one filleting station arranged downstream in the conveying direction 13. The filleting station comprises processing tools which are controllably movable and which are adapted to be controlled on the basis of the working position of the measuring elements 19, 20 detected by means of the apparatus according to the invention. In other words, the shoulder joints 15, 16 of the poultry bodies 10 form reference points which, after they have been measured by means of the apparatus according to the invention, are used for controlling the further processing tools.

Preferably, the processing tools of the filleting station are adapted to be controlled on the basis of the detected working position of the measuring elements 19, 20 that last comes into mechanical contact with the poultry body 10. This means that, in the case of anatomical differences between the right and left body halves of the poultry bodies 10, there is used as reference for the subsequent control of the processing tools the shoulder joint 15, 16 that, of the two, has the smaller geometric dimension. It is thereby ensured that the processing tools are controlled into the required working positions at the correct time in every case.

According to an advantageous further design, the controllably movable processing tools are in each case tools for processing the right and left side of the poultry body 10. The respective processing tools are in this case controlled separately by the respective measuring elements 19, 20. In other words, it is possible with the arrangement according to the invention to measure each body side of the poultry bodies 10 separately and to detect, for each of these sides, the respective position of the right or left shoulder joint 15, 16 by measurement. According to the positions determined in this manner of the left shoulder joint 15 and right shoulder joint 16, the processing tools on the right or left side are each controlled separately in a correspondingly associated manner.

The present invention relates also to a method for measuring the shoulder joint position of continuously conveyed poultry bodies 10. In order to avoid repetition, only selected aspects of the method according to the invention will be discussed hereinbelow, since the method is substantially analogous to the apparatus described in detail hereinbefore and to the arrangement according to the invention. As described hereinbefore, the poultry bodies 10 are conveyed by means of a conveying device along a conveying path 14 of the above-mentioned conveying line by means of a plurality of receiving elements 11 adapted for holding the poultry bodies 10. The poultry bodies 10 are conveyed, at least in the measuring section 17 of the conveying line, with the shoulder joints 15, 16 leading in the conveying direction 13.

The shoulder joints 15, 16 are each scanned by being brought into mechanical contact with the two measuring elements 19, 20. This scanning is effected as soon as one of the poultry bodies 10 passes the measuring station 18 with the measuring elements 19, 20. The measuring elements 19, 20 are thereby pivoted in the conveying direction 13 out of a rest position into a working position. The change of position of the measuring elements 19, 20 is detected as described hereinbefore by means of detection means 23, 24 of the measuring station 18.

The invention claimed is:

1. An apparatus for measuring a shoulder joint position of continuously conveyed poultry bodies, comprising:
   a conveying line having a conveying device having a plurality of receiving elements for holding the poultry bodies, the conveying device being adapted to continuously convey the poultry bodies in a conveying direction along a conveying path, wherein the conveying device is configured to convey the poultry bodies, at least in a measuring section of the conveying line, with the shoulder joints leading in the conveying direction;
   a measuring station, arranged along the conveying line in the measuring section, having two measuring elements which are adapted, as one of the poultry bodies passes, to come into mechanical contact with the shoulder joints of the poultry body; and
   wherein the measuring elements are each arranged so as to be pivotable about a pivot axis such that, in a rest position, they extend projecting into the conveying path at least substantially transversely to the conveying direction and, on contact with the shoulder joints of the poultry body in a working position, are adapted to be pivotably movably deflectable in the conveying direction, wherein the measuring station has detection means for detecting the working positions of the measuring elements; and
   wherein the measuring elements comprise mechanical damping elements which are adapted to mechanically damp the measuring elements in the rest position.

2. The apparatus according to claim 1, further comprising restoring means arranged on the measuring elements, the restoring means being adapted to exert a restoring moment on the measuring elements in a direction towards the rest position.

3. The apparatus according to claim 1, wherein the detection means are in the form of switching elements by which the rest position and/or the working position are/is detectable.

4. The apparatus according to claim 3, wherein the switching elements are in the form of inductive proximity sensors.

5. The apparatus according to claim 1, wherein the damping elements each comprise at least one pair of permanent magnets with mutually facing pole faces of opposite magnetic polarity.

6. The apparatus according to claim 5, wherein at least one permanent magnet of one of the pairs of permanent magnets is arranged on the measuring element so as to be pivotably movable therewith, and at least one permanent magnet of opposite polarity of the one of the pairs of permanent magnets is arranged so as to be fixed.

7. The apparatus according to claim 1, wherein free ends of the measuring elements in the rest position are arranged so as to be oriented relative to a perpendicular to the conveying direction by a correction angle contrary to the conveying direction.

8. The apparatus according to claim 1, further comprising:
a detection device arranged upstream of the measuring section with respect to the conveying direction, the detection device being configured to detect a passing of a reference point of the receiving elements, wherein the reference point of the receiving elements is so chosen that the shoulder joints of the poultry body lead in the conveying direction relative to the reference point; and
a control device connected to the detection device and to the detection means, the control device being configured to determine an interval between the passing of the reference point and the detection of the working positions of the measuring elements and to determine the shoulder joint position on a basis of a size of this interval and a conveying speed of the conveying device.

9. The apparatus according to claim 8, wherein the control device is configured to determine the interval on a basis of conveying distance or on a basis of time by a rotary encoder arranged on the conveying device for detecting the conveying position.

10. An arrangement for filleting poultry bodies, comprising:
the apparatus for measuring the shoulder joint position of the continuously conveyed poultry bodies according to claim 1; and
at least one filleting station arranged downstream in the conveying direction;
wherein processing tools of the filleting station are adapted to be controlled on a basis of the working positions of the measuring elements detected by the detecting means of the apparatus for measuring the shoulder joint position.

11. The arrangement according to claim 10, wherein the processing tools are adapted to be controlled on the basis of the detected working position of the measuring elements that last came into mechanical contact with the poultry body.

12. The arrangement according to claim 11, wherein the processing tools each comprise tools for processing a right and left side of the poultry body and are adapted to be controlled separately by the measuring elements.

13. A method for measuring a shoulder joint position of continuously conveyed poultry bodies, comprising:
continuously conveying the poultry bodies along a conveying path of a conveying line by a plurality of receiving elements of a conveying device which are adapted for holding the poultry bodies, wherein the poultry bodies, at least in a measuring section of the conveying line, are conveyed with the shoulder joints leading in a conveying direction; and
scanning the shoulder joints of the poultry bodies by bringing the shoulder joints into mechanical contact with two measuring elements of a measuring station as one of the poultry bodies passes, which measuring elements are arranged along the conveying line in the measuring section;
wherein the measuring elements, on contact with the shoulder joints of the poultry body, are pivoted in the conveying direction out of a rest position, in which the measuring elements extend projecting into the conveying path at least substantially transversely to the conveying direction, into a working position, and in that the working positions of the measuring elements are detected by means of detection means of the measuring station; and
mechanically damping of the pivoting movement of the measuring elements in the rest position by mechanical damping elements.

14. The method according to claim 13, further comprising exertion of a restoring moment in a direction towards the rest position by restoring means arranged on the measuring elements.

15. The method according to claim 13, wherein the detection of the rest position and/or of the working position is by the detection means in the form of switching elements.

16. The method according to claim 15, wherein the detection is contactless detection of the rest position and/or of the working position by the switching means in the form of inductive proximity sensors.

17. The method according to claim 16, wherein the damping takes place magnetically.

18. The method according to claim 13, wherein free ends of the measuring elements in the rest position are oriented relative to a perpendicular to the conveying direction by a correction angle contrary to the conveying direction.

19. The method according to claim 13, further comprising:
detection of a time of passing of a reference point of the receiving elements by a detection device arranged upstream of the measuring section with respect to the conveying direction, wherein the reference point of the receiving elements is so chosen that the shoulder joints of the poultry body lead in the conveying direction relative to the reference point;
determination of a time interval between the time of passing of the reference point and the time of detection of the working positions of the measuring elements by the detection means; and
determination of the shoulder joint position by a control device on the basis of the size of the time interval and the conveying speed of the conveying device.

20. The method for filleting poultry bodies, comprising:
determining the shoulder joint position of the continuously conveyed poultry bodies by a method according to claim 13; and
controlling processing tools of an at least one filleting station arranged downstream of the measuring station in the conveying direction on the basis of the working positions of the measuring elements detected by the detection means.

* * * * *